US012786886B2

(12) United States Patent
Mei et al.

(10) Patent No.: US 12,786,886 B2
(45) Date of Patent: Nov. 3, 2026

(54) DATA SENDING METHOD, RADIO FREQUENCY APPARATUS, AND CONTROL APPARATUS

(71) Applicant: Huawei Technologies Co., Ltd., Shenzhen (CN)

(72) Inventors: Jingquan Mei, Shanghai (CN); Haibo Li, Shenzhen (CN); Wenda Fan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 18/757,765

(22) Filed: Jun. 28, 2024

(65) Prior Publication Data

US 2024/0349197 A1 Oct. 17, 2024

Related U.S. Application Data

(63) Continuation of application No. PCT/CN2022/133408, filed on Nov. 22, 2022.

(30) Foreign Application Priority Data

Dec. 31, 2021 (CN) ......................... 202111669147.6

(51) Int. Cl.
*H04W 52/22* (2009.01)
*H04W 52/06* (2009.01)

(52) U.S. Cl.
CPC .................................. *H04W 52/06* (2013.01)

(58) Field of Classification Search
CPC . H04W 52/06; H04W 52/247; H04W 52/248; H04W 52/346; H04W 52/30;
(Continued)

(56) References Cited

U.S. PATENT DOCUMENTS

2002/0094835 A1* 7/2002 Hayashi ................ H04W 52/12 370/335
2003/0114124 A1* 6/2003 Higuchi ............... H03G 3/3047 455/522
(Continued)

FOREIGN PATENT DOCUMENTS

CN 109842928 A 6/2019
CN 110167123 A 8/2019
(Continued)

OTHER PUBLICATIONS

3GPP TSG RAN WG1 Meeting #92 R1-1801803 ", TP for power control for EN-DC in TS38.213",Hua Wei et al.,Feb. 17, 2018(Feb. 17, 2018),total 4 pages.

*Primary Examiner* — Andrew Wendell
(74) *Attorney, Agent, or Firm* — Slater Matsil, LLP

(57) ABSTRACT

This application provides data sending methods, radio frequency apparatuses, and control apparatuses. An example method includes obtaining a transmit power. The transmit power is determined based on first power increase information and second power increase information. The first power increase information indicates a first power increase amplitude corresponding to a first standard in a time unit. The second power increase information indicates a second power increase amplitude corresponding to a second standard in the time unit. The example method further includes sending, based on the transmit power, data corresponding to the time unit. The first standard and the second standard are different baseband working standards.

20 Claims, 5 Drawing Sheets

(58) Field of Classification Search
CPC ........ H04W 52/22; H04W 24/02; H04B 1/04; H04B 2001/0416; H04B 7/18543; H04L 27/26; H04L 27/2623; H04L 41/0893
See application file for complete search history.

(56) References Cited

U.S. PATENT DOCUMENTS

2005/0250528 A1* 11/2005 Song ..................... H04W 52/32
455/522
2006/0264230 A1* 11/2006 Ozluturk ............. H04W 52/143
455/522
2008/0227479 A1* 9/2008 Iwata .................. H04W 52/228
455/522
2010/0215111 A1* 8/2010 Filipovic .............. H04B 7/0608
375/267
2018/0343626 A1* 11/2018 Li ........................... H04W 4/46
2019/0068234 A1 2/2019 Khlat et al.
2020/0120699 A1* 4/2020 Shao ................. H04W 72/1268
2020/0128494 A1 4/2020 Lu et al.
2020/0145934 A1* 5/2020 Wang .................... H04L 5/0094
2020/0374817 A1* 11/2020 Xue .................... H04W 52/146
2021/0227475 A1* 7/2021 Tang ................... H04W 52/146
2022/0303920 A1* 9/2022 Kim ...................... H04L 1/0003

FOREIGN PATENT DOCUMENTS

CN 113055994 A 6/2021
CN 114499554 A 5/2022
WO 2020090067 A1 5/2020

* cited by examiner

DATA SENDING METHOD, RADIO FREQUENCY APPARATUS, AND CONTROL APPARATUS

CROSS-REFERENCE TO RELATED APPLICATIONS

This application is a continuation of International Application No. PCT/CN2022/133408, filed on Nov. 22, 2022, which claims priority to Chinese Patent Application No. 202111669147.6, filed on Dec. 31, 2021. The disclosures of the aforementioned applications are hereby incorporated by reference in their entireties.

TECHNICAL FIELD

This application relates to the field of communication technologies, and more specifically, to a data sending method, a radio frequency apparatus, and a control apparatus.

BACKGROUND

Currently, two different baseband working standards may share a carrier. For example, new radio (NR) and long term evolution (LTE) may share a spectrum resource. The NR and the LTE may report respective channel configuration information to a resource allocation node. The resource allocation node may configure a resource block (RB) and a power based on the channel configuration information of the two standards. Further, a baseband processing unit corresponding to the NR and a baseband processing unit corresponding to the LTE may separately schedule the configured RB and the configured power.

However, when the two standards share a power, in the two standards, data needs to be sent based on a configured fixed transmit power, and the power cannot be increased. If the power is increased in the two standards or one of the standards, a total power of the two standards may exceed a power usage range because the baseband processing unit of either of the two standards cannot detect whether the power is increased in the other standard. This affects hardware running and overall performance.

Therefore, a data sending method, a radio frequency apparatus, and a control apparatus are urgently required to improve flexibility of sending data by a system.

SUMMARY

This application provides a data sending method, a radio frequency apparatus, and a control apparatus, to improve flexibility of sending data by a system.

According to a first aspect, a data sending method is provided. The method may be performed by a radio frequency apparatus or a chip in the radio frequency apparatus. The method includes: The radio frequency apparatus obtains a transmit power. The transmit power is determined based on first power increase information and second power increase information. The first power increase information indicates a first power increase amplitude corresponding to a first standard in a time unit. The second power increase information indicates a second power increase amplitude corresponding to a second standard in the time unit. The radio frequency apparatus sends, based on the transmit power, data corresponding to the time unit. The first standard and the second standard are different baseband working standards.

Therefore, in this application, the radio frequency apparatus obtains the transmit power determined based on both the first power increase information and the second power increase information, and may also increase a power in a scenario in which two standards share a power, to improve flexibility of sending data by a system.

With reference to the first aspect, in some implementations of the first aspect, that the radio frequency apparatus obtains a transmit power includes: The radio frequency apparatus receives the first power increase information from a first control apparatus. The radio frequency apparatus receives the second power increase information from a second control apparatus. The radio frequency apparatus determines the transmit power based on total power information. The total power information is determined based on the first power increase amplitude and the second power increase amplitude. The total power information is for determining a total power spectrum. The total power spectrum indicates a correspondence between a frequency and a power in the time unit.

Therefore, in this application, the first control apparatus and the second control apparatus may separately send respective power increase information to the radio frequency apparatus. After receiving the two pieces of power increase information, the radio frequency apparatus combines the two pieces of power increase information, and can further determine, based on the total power information obtained after combination in the two standards and a transmit capability of the radio frequency apparatus, a transmit power for finally sending data, so that a power can also be increased in a scenario in which two standards share a power, to improve flexibility of sending data by a system.

With reference to the first aspect, in some implementations of the first aspect, that the radio frequency apparatus obtains a transmit power includes: The radio frequency apparatus receives total power information from a first control apparatus; or the radio frequency apparatus receives total power information from a second control apparatus. The radio frequency apparatus determines the transmit power based on the total power information. The total power information is determined based on the first power increase amplitude and the second power increase amplitude.

Therefore, in this application, the first control apparatus or the second control apparatus may combine the first power increase information and the second power increase information to generate the total power information, and send the total power information to the radio frequency apparatus. Further, the radio frequency apparatus determines, based on the total power information obtained after combination in the two standards and a transmit capability of the radio frequency apparatus, a transmit power for finally sending data, so that a power can also be increased in a scenario in which two standards share a power, to improve flexibility of sending data by a system.

With reference to the first aspect, in some implementations of the first aspect, that the radio frequency apparatus determines the transmit power based on the total power information includes: When a total power of a total power spectrum is greater than or equal to a first threshold, and a spectral density of the total power spectrum is greater than or equal to a second threshold, the radio frequency apparatus determines the transmit power by performing clipping processing on the total power spectrum. The total power spectrum is determined based on the total power information. The total power spectrum indicates a correspondence between a frequency and a power in the time unit.

Therefore, in this application, the radio frequency apparatus may determine, based on the total power spectrum, whether clipping processing needs to be performed, to improve reliability of sending data by a system.

With reference to the first aspect, in some implementations of the first aspect, that the radio frequency apparatus obtains a transmit power includes: The radio frequency apparatus receives the transmit power from a first control apparatus; or the radio frequency apparatus receives the transmit power from a second control apparatus.

Therefore, in this application, the first control apparatus or the second control apparatus may obtain capability information for sending data by the radio frequency apparatus, generate the total power information based on the first power increase information and the second power increase information, and determine, based on the total power information, the transmit power for sending data by the radio frequency apparatus, so that a power can also be increased in a scenario in which two standards share a power, to improve flexibility of sending data by a system.

With reference to the first aspect, in some implementations of the first aspect, the time unit is a symbol.

Therefore, in this application, the radio frequency apparatus may obtain a transmit power at a symbol granularity, to improve flexibility of sending data by a system.

According to a second aspect, a data sending method is provided. The method may be performed by a control apparatus or a chip in the control apparatus. The control apparatus may include a first control apparatus and a second control apparatus. The method includes: The first control apparatus sends first power increase information to a radio frequency apparatus. The first power increase information indicates a first power increase amplitude corresponding to a first standard in a time unit. The first power increase amplitude and a second power increase amplitude corresponding to a second standard in the time unit are for determining total power information. The total power information is for determining a transmit power. The transmit power is for sending data corresponding to the time unit. The first standard and the second standard are different baseband working standards.

Therefore, in this application, the radio frequency apparatus obtains a transmit power determined based on both the first power increase information and second power increase information, and may also increase a power in a scenario in which two standards share a power, to improve flexibility of sending data by a system.

With reference to the second aspect, in some implementations of the second aspect, the method further includes: The second control apparatus sends second power increase information to the radio frequency apparatus. The second power increase information indicates the second power increase amplitude.

With reference to the second aspect, in some implementations of the second aspect, the time unit is a symbol.

According to a third aspect, a data sending method is provided. The method may be performed by a control apparatus or a chip in the control apparatus. The control apparatus may include a first control apparatus. The method includes: The first control apparatus receives second power increase information from a second control apparatus. The second power increase information indicates a second power increase amplitude corresponding to a second standard in a time unit. The first control apparatus determines total power information based on a first power increase amplitude corresponding to a first standard in the time unit and the second power increase amplitude. The total power information is for determining a transmit power. The transmit power is for sending data corresponding to the time unit. The first control apparatus sends the total power information to a radio frequency apparatus. The first standard and the second standard are different baseband working standards.

Therefore, in this application, the radio frequency apparatus obtains a transmit power determined based on both first power increase information and the second power increase information, and may also increase a power in a scenario in which two standards share a power, to improve flexibility of sending data by a system.

With reference to the third aspect, in some implementations of the third aspect, the time unit is a symbol.

According to a fourth aspect, a data sending method is provided. The method may be performed by a radio frequency apparatus and a control apparatus, or a chip in the radio frequency apparatus and a chip in the control apparatus. The control apparatus includes a first control apparatus and a second control apparatus. The method includes: The first control apparatus sends first power increase information to the radio frequency apparatus. The first power increase information indicates a first power increase amplitude corresponding to a first standard in a time unit. The second control apparatus sends second power increase information to the radio frequency apparatus. The second power increase information indicates a second power increase amplitude corresponding to a second standard in the time unit. The radio frequency apparatus determines a transmit power based on the first power increase information and the second power increase information. The radio frequency apparatus sends, based on the transmit power, data corresponding to the time unit. The first standard and the second standard are different baseband working standards.

Therefore, in this application, the radio frequency apparatus obtains the transmit power determined based on both the first power increase information and the second power increase information, and may also increase a power in a scenario in which two standards share a power, to improve flexibility of sending data by a system.

With reference to the fourth aspect, in some implementations of the fourth aspect, that the radio frequency apparatus determines a transmit power based on the first power increase information and the second power increase information includes: The radio frequency apparatus determines the transmit power based on total power information. The total power information is determined based on the first power increase amplitude and the second power increase amplitude. The total power information is for determining a total power spectrum. The total power spectrum indicates a correspondence between a frequency and a power in the time unit. When a total power of the total power spectrum is greater than or equal to a first threshold, and a spectral density of the total power spectrum is greater than or equal to a second threshold, the radio frequency apparatus determines the transmit power by performing clipping processing on the total power spectrum.

With reference to the fourth aspect, in some implementations of the fourth aspect, the time unit is a symbol.

According to a fifth aspect, a data sending method is provided. The method may be performed by a radio frequency apparatus and a control apparatus, or a chip in the radio frequency apparatus and a chip in the control apparatus. The control apparatus includes a first control apparatus and a second control apparatus. The method includes: The second control apparatus sends second power increase information to the first control apparatus. The second power increase information indicates a second power increase amplitude corresponding to a second standard in a time unit. The first control apparatus determines total power information based on first power increase information and the second power increase information. The first power increase information indicates a first power increase amplitude corresponding to a first standard in the time unit. The total power information is determined based on the first power increase amplitude and the second power increase amplitude. The first control apparatus sends the total power information to the radio frequency apparatus. The radio frequency apparatus determines a transmit power based on the total power information. The first standard and the second standard are different baseband working standards.

Therefore, in this application, the radio frequency apparatus obtains the transmit power determined based on both the first power increase information and the second power increase information, and may also increase a power in a scenario in which two standards share a power, to improve flexibility of sending data by a system.

With reference to the fifth aspect, in some implementations of the fifth aspect, that the radio frequency apparatus determines a transmit power based on the total power information includes: When a total power of a total power spectrum is greater than or equal to a first threshold, and a spectral density of the total power spectrum is greater than or equal to a second threshold, the radio frequency apparatus determines the transmit power by performing clipping processing on the total power spectrum. The total power spectrum is determined based on the total power information. The total power spectrum indicates a correspondence between a frequency and a power in the time unit.

With reference to the fifth aspect, in some implementations of the fifth aspect, the time unit is a symbol.

According to a sixth aspect, a radio frequency apparatus is provided. The apparatus includes an obtaining unit and a transceiver unit. The obtaining unit is configured to obtain a transmit power. The transmit power is determined based on first power increase information and second power increase information. The first power increase information indicates a first power increase amplitude corresponding to a first standard in a time unit. The second power increase information indicates a second power increase amplitude corresponding to a second standard in the time unit. The transceiver unit is configured to send, based on the transmit power, data corresponding to the time unit. The first standard and the second standard are different baseband working standards.

Therefore, in this application, the radio frequency apparatus obtains the transmit power determined based on both the first power increase information and the second power increase information, and may also increase a power in a scenario in which two standards share a power, to improve flexibility of sending data by a system.

With reference to the sixth aspect, in some implementations of the sixth aspect, the obtaining unit is specifically configured to: receive the first power increase information from a first control apparatus, receive the second power increase information from a second control apparatus, and determine the transmit power based on total power information. The total power information is determined based on the first power increase amplitude and the second power increase amplitude. The total power information is for determining a total power spectrum. The total power spectrum indicates a correspondence between a frequency and a power in the time unit.

With reference to the sixth aspect, in some implementations of the sixth aspect, the obtaining unit is specifically configured to: receive total power information from a first control apparatus; or receive total power information from a second control apparatus; and determine the transmit power based on the total power information. The total power information is determined based on the first power increase amplitude and the second power increase amplitude.

With reference to the sixth aspect, in some implementations of the sixth aspect, when a total power of the total power spectrum is greater than or equal to a first threshold, and a spectral density of the total power spectrum is greater than or equal to a second threshold, the obtaining unit is specifically configured to determine the transmit power by performing clipping processing on the total power spectrum. The total power spectrum is determined based on the total power information. The total power spectrum indicates a correspondence between a frequency and a power in the time unit.

With reference to the sixth aspect, in some implementations of the sixth aspect, the obtaining unit is specifically configured to receive the transmit power from a first control apparatus. Alternatively, the obtaining unit is specifically configured to receive the transmit power from a second control apparatus.

With reference to the sixth aspect, in some implementations of the sixth aspect, the time unit is a symbol.

According to a seventh aspect, a control apparatus is provided. The control apparatus includes a first control apparatus. The first control apparatus includes a first transceiver unit. The first transceiver unit is configured to send first power increase information to a radio frequency apparatus. The first power increase information indicates a first power increase amplitude corresponding to a first standard in a time unit. The first power increase amplitude and a second power increase amplitude corresponding to a second standard in the time unit are for determining total power information. The total power information is for determining a transmit power. The transmit power is for sending data corresponding to the time unit. The first standard and the second standard are different baseband working standards.

Therefore, in this application, the radio frequency apparatus obtains a transmit power determined based on both the first power increase information and second power increase information, and may also increase a power in a scenario in which two standards share a power, to improve flexibility of sending data by a system.

With reference to the seventh aspect, in some implementations of the seventh aspect, the control apparatus further includes a second control apparatus. The second control apparatus includes a second transceiver unit. The second transceiver unit is configured to send second power increase information to the radio frequency apparatus. The second power increase information indicates a second power increase amplitude.

With reference to the seventh aspect, in some implementations of the seventh aspect, the time unit is a symbol.

According to an eighth aspect, a control apparatus is provided. The control apparatus includes a first control apparatus. The first control apparatus includes a first transceiver unit and a first processing unit. The first transceiver unit is configured to receive second power increase information from a second control apparatus. The second power increase information indicates a second power increase amplitude corresponding to a second standard in a time unit. The first processing unit is configured to determine total power information based on first power increase information and the second power increase information. The first power increase information indicates a first power increase amplitude corresponding to a first standard in the time unit. The total power information is determined based on the first power increase amplitude and the second power increase amplitude. The total power information is for determining a transmit power. The transmit power is for sending data corresponding to the time unit. The first transceiver unit is further configured to send the total power information to a radio frequency apparatus. The first standard and the second standard are different baseband working standards.

Therefore, in this application, the radio frequency apparatus obtains the transmit power determined based on both the first power increase information and the second power increase information, and may also increase a power in a scenario in which two standards share a power, to improve flexibility of sending data by a system.

With reference to the eighth aspect, in some implementations of the eighth aspect, the time unit is a symbol.

According to a ninth aspect, a radio frequency apparatus is provided. The apparatus may include a transceiver unit and an obtaining unit. The obtaining unit may be a processing unit; the obtaining unit may be a transceiver unit; or the obtaining unit may be a combination of a transceiver unit and a processing unit. Optionally, the transceiver unit may alternatively be a sending unit and a receiving unit.

The processing unit may be a processor. The transceiver unit may be a transceiver. The apparatus may further include a storage unit, and the storage unit may be a memory. The storage unit is configured to store instructions, and the processing unit executes the instructions stored in the storage unit, to enable the radio frequency apparatus to perform the method in any one of the first aspect or the possible implementations of the first aspect. When the apparatus is a chip in the radio frequency apparatus, the processing unit may be a processor, and the transceiver unit may be an input/output interface, a pin, a circuit, or the like. The processing unit executes the instructions stored in the storage unit, to enable the chip to perform the method in any one of the first aspect or the possible implementations of the first aspect. The storage unit is configured to store instructions. The storage unit may be a storage unit (for example, a register or a cache) in the chip, or may be a storage unit (for example, a read-only memory or a random access memory) located outside the chip in the radio frequency apparatus.

According to a tenth aspect, a control apparatus is provided. The control apparatus may include a transceiver unit and a processing unit. Optionally, the transceiver unit may be a sending unit and a receiving unit.

When the control apparatus is a first control apparatus, the processing unit may be a processor, and the transceiver unit may be a transceiver. The apparatus may further include a storage unit, and the storage unit may be a memory. The storage unit is configured to store instructions, and the processing unit executes the instructions stored in the storage unit, to enable the control apparatus to perform the method in any one of the second aspect or the possible implementations of the second aspect, or implement the method in any one of the third aspect or the possible implementations of the third aspect. When the apparatus is a chip in the control apparatus, the processing unit may be a processor, and the transceiver unit may be an input/output interface, a pin, a circuit, or the like. The processing unit executes the instructions stored in the storage unit, to enable the chip to perform the method in any one of the second aspect or the possible implementations of the second aspect, or implement the method in any one of the third aspect or the possible implementations of the third aspect. The storage unit is configured to store instructions. The storage unit may be a storage unit (for example, a register or a cache) in the chip, or may be a storage unit (for example, a read-only memory or a random access memory) located outside the chip in the control apparatus.

When the control apparatus is a second control apparatus, the processing unit may be a processor, and the transceiver unit may be a transceiver. The apparatus may further include a storage unit, and the storage unit may be a memory. The storage unit is configured to store instructions, and the processing unit executes the instructions stored in the storage unit, to enable the control apparatus to perform the method in any one of the second aspect or the possible implementations of the second aspect, or implement the method in any one of the third aspect or the possible implementations of the third aspect. When the apparatus is a chip in the control apparatus, the processing unit may be a processor, and the transceiver unit may be an input/output interface, a pin, a circuit, or the like. The processing unit executes the instructions stored in the storage unit, to enable the chip to perform the method in any one of the second aspect or the possible implementations of the second aspect, or implement the method in any one of the third aspect or the possible implementations of the third aspect. The storage unit is configured to store instructions. The storage unit may be a storage unit (for example, a register or a cache) in the chip, or may be a storage unit (for example, a read-only memory or a random access memory) located outside the chip in the control apparatus.

According to an eleventh aspect, this application provides an apparatus, including a processor. The processor is coupled to a memory, and may be configured to execute instructions in the memory, to implement the method in any one of the first aspect or the possible implementations of the first aspect, implement the method in any one of the second aspect or the possible implementations of the second aspect, or implement the method in any one of the third aspect or the possible implementations of the third aspect. The apparatus further includes a memory. The apparatus further includes a communication interface, and the processor is coupled to the communication interface.

In an implementation, the apparatus is a radio frequency apparatus. When the apparatus is the radio frequency apparatus, the communication interface may be a transceiver or an input/output interface.

In another implementation, the apparatus is a chip or a chip system configured in a radio frequency apparatus. When the apparatus is the chip or the chip system configured in the radio frequency apparatus, the communication interface may be an input/output interface.

In an implementation, the apparatus is a first control apparatus. When the apparatus is the first control apparatus, the communication interface may be a transceiver or an input/output interface.

In another implementation, the apparatus is a chip or a chip system configured in a first control apparatus. When the apparatus is the chip or the chip system configured in the first control apparatus, the communication interface may be an input/output interface.

In an implementation, the apparatus is a second control apparatus. When the apparatus is the second control apparatus, the communication interface may be a transceiver or an input/output interface.

In another implementation, the apparatus is a chip or a chip system configured in a second control apparatus. When the apparatus is the chip or the chip system configured in the second control apparatus, the communication interface may be an input/output interface.

The transceiver may be a transceiver circuit. The input/output interface may be an input/output circuit.

According to a twelfth aspect, a computer-readable storage medium is provided. The computer-readable storage medium stores a computer program or instructions. When the computer program or the instructions are executed, the method in any one of the first aspect or the possible implementations of the first aspect is implemented, the method in any one of the second aspect or the possible implementations of the second aspect is implemented, or the method in any one of the third aspect or the possible implementations of the third aspect is implemented.

According to a thirteenth aspect, a computer program product including instructions is provided. When the instructions are run, the method in any one of the first aspect or the possible implementations of the first aspect is implemented, the method in any one of the second aspect or the possible implementations of the second aspect is implemented, or the method in any one of the third aspect or the possible implementations of the third aspect is implemented.

According to a fourteenth aspect, a computer program is provided. The computer program includes code or instructions. When the code or the instructions are run, the method in any one of the first aspect or the possible implementations of the first aspect is implemented, the method in any one of the second aspect or the possible implementations of the second aspect is implemented, or the method in any one of the third aspect or the possible implementations of the third aspect is implemented.

According to a fifteenth aspect, a chip system is provided. The chip system includes a processor and may further include a memory, configured to implement the method in any one of the first aspect or the possible implementations of the first aspect, implement the method in any one of the second aspect or the possible implementations of the second aspect, or implement the method in any one of the third aspect or the possible implementations of the third aspect. The chip system may include a chip, or may include a chip and another discrete component.

According to a sixteenth aspect, a communication system is provided. The system includes the apparatus in any one of the sixth aspect or the possible implementations of the sixth aspect and the apparatus in any one of the seventh aspect or the possible implementations of the seventh aspect. Alternatively, the system includes the apparatus in any one of the sixth aspect or the possible implementations of the sixth aspect and the apparatus in any one of the eighth aspect or the possible implementations of the eighth aspect.

In some implementations, a radio frequency apparatus is a radio unit RU, and a control apparatus is a baseband unit BU.

In some implementations, a first standard is new radio NR, and a second standard is long term evolution LTE. Alternatively, a first standard is LTE, and a second standard is NR.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a LTE system, a frequency division duplex (FDD) system, a time division duplex (TDD) system, a 5th generation (5G) system or a NR, and a 6th generation (6G) system or a future communication system. A 5G mobile communication system in this application includes a non-standalone (NSA) 5G mobile communication system or a standalone (SA) 5G mobile communication system. The communication system may alternatively be a public land mobile network (PLMN), a device-to-device (D2D) communication system, a machine to machine (M2M) communication system, an internet of things (IoT) communication system, a vehicle to everything (V2X) communication system, an unmanned aerial vehicle (UAV) communication system, or another communication system.

In addition, a network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

For ease of understanding of embodiments of this application, an application scenario of embodiments of this application is first described in detail with reference to FIG. 1.

Figure 1:
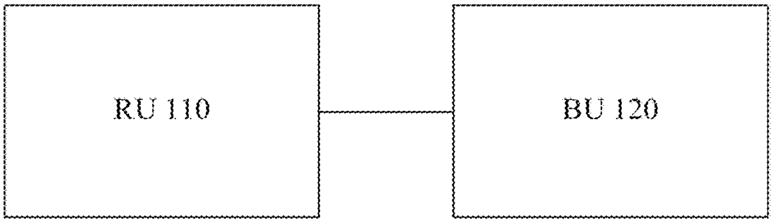
FIG. 1 is a schematic diagram of a structure of a communication system to which an embodiment of this application is applicable.

FIG. 1 is a schematic diagram of a structure of a communication system to which an embodiment of this application is applicable. Apparatuses that may be used in the communication system are first described.

1. Radio unit (RU) 110: The RU 110 may implement functions of performing intermediate frequency processing, radio frequency processing, duplexing, and the like on a signal. For example, the RU 110 may be a remote radio unit (RRU), an active antenna processing unit (AAU), or another network element or communication apparatus that has a capability of processing an intermediate frequency signal, a radio frequency signal, or an intermediate radio frequency signal. In some communication systems, for example, communication systems that use enhanced common public radio interfaces (eCPRIs), the RU 110 may further have some baseband processing functions. This is not particularly limited in this application.

In this embodiment of this application, the RU 110 may further include a multimode-multiband architecture radio platform (MARP), and the MARP may implement intermediate frequency processing and radio frequency processing on a signal.

2. Baseband unit (BU) 120: The BU 120 may implement a baseband signal processing function. For example, the BU 120 may be a baseband unit (BBU), a central control unit (CU), a distributed control unit (DU), or another network element or communication apparatus that has a baseband signal processing capability.

In this embodiment of this application, the BU 120 may support a plurality of baseband working standards. For example, the BU 120 may support both an NR standard and an LTE standard. In this case, the BU 120 may include a first control apparatus and a second control apparatus. The first control apparatus may independently implement baseband processing of the NR standard. The second control apparatus may independently implement baseband processing of the LTE standard.

The first control apparatus for baseband processing of the NR standard may include a physical layer (which may also be referred to as a layer 1 (L1)), a data link layer (which may also be referred to as an L2), and a network layer (which may also be referred to as an L3). The L1 may implement functions such as resource block matching, compression, encryption, data encoding and decoding, modulation and demodulation, and check. The L2 may include an RLC layer and a MAC layer, may implement resource scheduling, may allocate data to different resource blocks, and may implement data identification and assembly. The L3 may include an RRC layer and a NAS layer, and may implement resource allocation and management.

Correspondingly, the second control apparatus for baseband processing of the LTE standard may also include the L1, the L2, and the L3, and perform related baseband processing on the LTE standard.

The BU 120 and the RU 110 may be connected by using an optical fiber. A communication interface between the BU 120 and the RU 110 may be referred to as a fronthaul interface. For example, the fronthaul interface may be a common public radio interface (CPRI), an eCPRI interface, or another interface that is defined in the future and that is for connecting the BU 120 and the RU 110. This is not particularly limited in this application.

In this embodiment of this application, when the BU 120 includes the first control apparatus for baseband processing of the NR standard and the second control apparatus for baseband processing of the LTE standard, the first control apparatus and the second control apparatus may separately communicate with the RU 110. For example, the first control apparatus and the second control apparatus may each be connected to the RU 110 by using optical fibers for communication, or the first control apparatus and the second control apparatus may be connected to the RU 110 by sharing an optical fiber for communication. When the first control apparatus and the second control apparatus share an optical fiber to communicate with the RU 110, the first control apparatus and the second control apparatus may be connected to a same node, and communicate with the RU 110 via the node. Alternatively, a communication link may be established between the first control apparatus and the second control apparatus. The first control apparatus sends information about the NR standard to the second control apparatus, and the second control apparatus sends the information about the NR standard and information about the LTE standard to the RU 110; and vice versa.

The NR standard and the LTE standard may share a frequency resource and a power. For example, some frequencies on one symbol are for data transmission of the NR standard, and some frequencies are for data transmission of the LTE standard. The LTE standard and the NR standard share a frequency resource corresponding to the symbol and also share a power configured for the symbol. A frequency resource corresponding to one symbol may be divided at a granularity of a resource element (RE). One RE is one subcarrier in frequency domain. A frequency resource corresponding to one symbol may include at least one subcarrier or RE. A frequency resource corresponding to one symbol may alternatively be divided at a granularity of an RB. One RB includes 12 subcarriers in frequency domain. A frequency resource corresponding to one symbol may include at least one RB. This is not particularly limited in this application. For clarity, an example in which a frequency resource corresponding to one symbol is divided at a granularity of an RE or a subcarrier is used below.

In this embodiment of this application, the symbol is also referred to as a time domain symbol, and may be specifically an orthogonal frequency division multiplexing (OFDM) symbol, a discrete Fourier transform-spread-OFDM (DFT-s-OFDM) symbol, or another time domain symbol defined in future communication.

Figure 2:
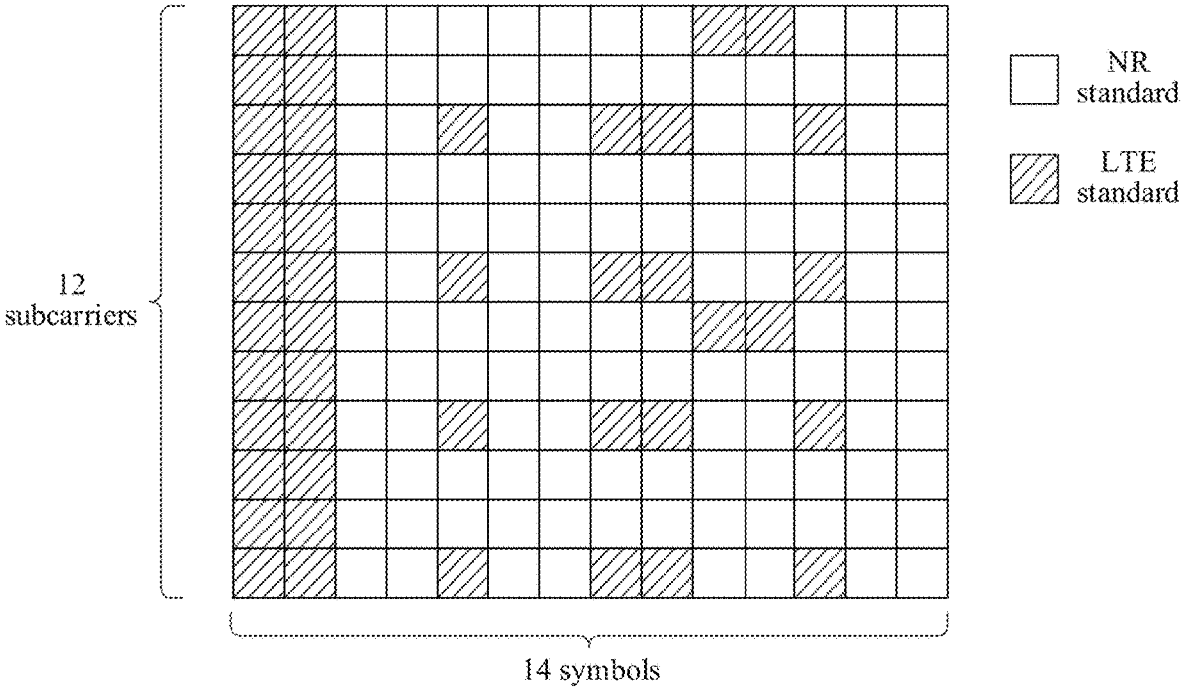
FIG. 2 is a schematic diagram in which an NR standard and an LTE standard share an RB.

FIG. 2 is a schematic diagram in which an NR standard and an LTE standard share an RB. Refer to FIG. 2. One RB includes 12 subcarriers in frequency domain, and a BU may allocate, at a granularity of a resource element (RE), a resource occupied by the NR standard and a resource occupied by the LTE standard. One RE is one subcarrier in frequency domain, and is one symbol in time domain. It can be learned that, on one symbol, some subcarriers may be for data transmission of the NR standard, and some subcarriers may be for data transmission of the LTE standard. Correspondingly, a power configured for one symbol is used for both data transmission of the NR standard and data transmission of the LTE standard.

Figure 3:
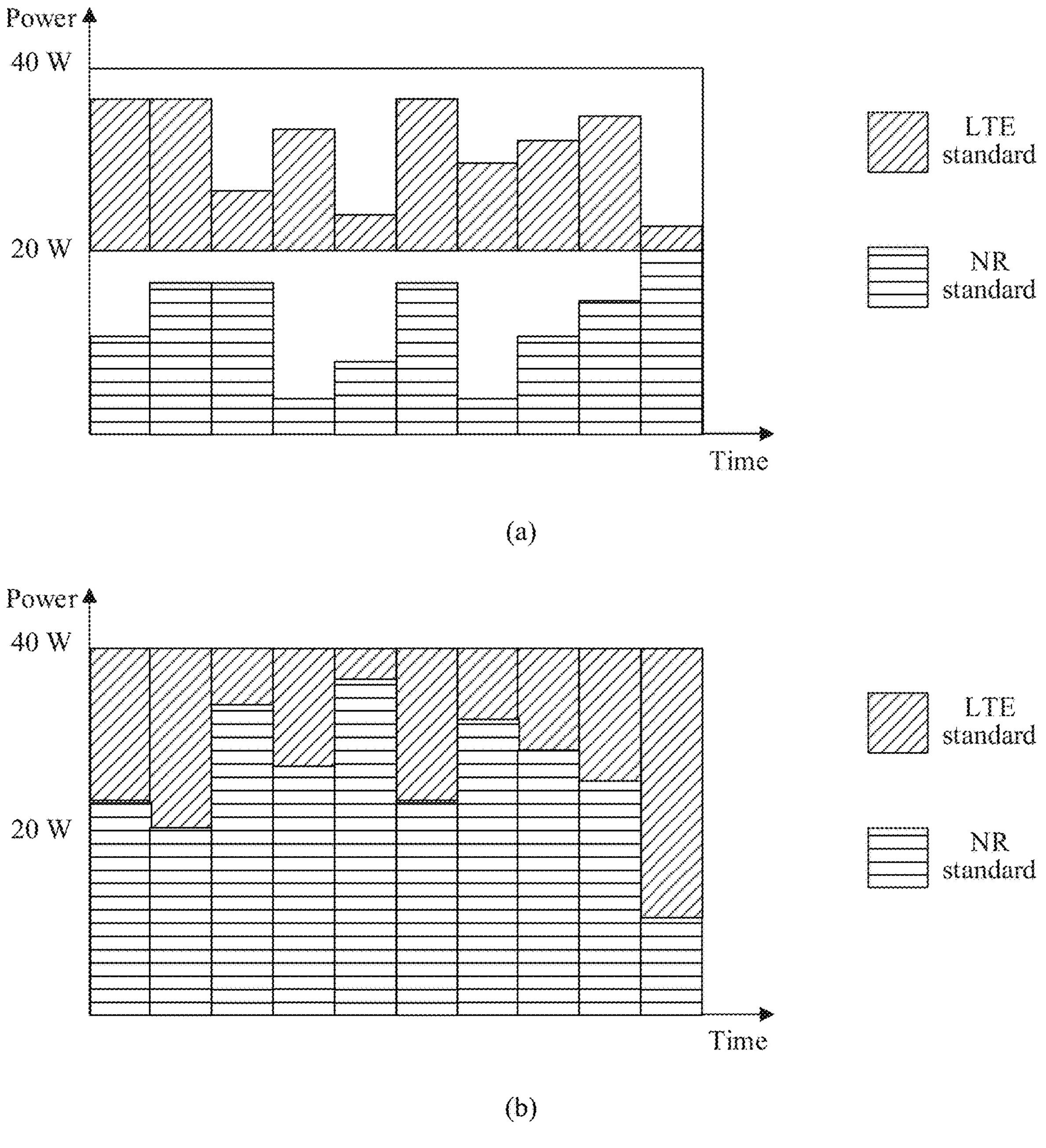
FIG. 3 is a schematic diagram in which an LTE standard and an NR standard share a power.

FIG. 3 is a schematic diagram in which an LTE standard and an NR standard share a power. Refer to (a) in FIG. 3. For example, a total power of 40 W is configured for one RB. An available power specification that is configured for the LTE standard is 20 W, and an available power specification that is configured for the NR standard is 20 W. In this case, compared with a single-standard system, in this system, power quotas of the two standards each are reduced by a half, and a power that is not used may exist in both the two standards, resulting in a serious waste of power specifications.

Refer to (b) in FIG. 3. For example, a total power of 40 W is configured for one RB. When allocating, at a granularity of an RE, a resource occupied by the NR standard and a resource occupied by the LTE standard, a BU may perform power allocation based on the occupied resources. For example, in the RB, the NR standard may use a power of 30 W, and the LTE standard may use a power of 10 W. In this case, an available power specification that is configured for the LTE standard is 40 W, and an available power specification that is configured for the NR standard is also 40 W. This reduces a waste of power specifications. However, in this case, in the NR standard, when the power of 30 W is scheduled, the power can be sent only based on a fixed parameter of a channel corresponding to each RE, and in the LTE standard, when the power of 10 W is scheduled, the power can be sent only based on the fixed parameter of the channel corresponding to each RE. A power of a channel cannot be increased in the NR standard or the LTE standard. Otherwise, a total power of the two standards may exceed 40 W, affecting hardware running and overall performance.

Therefore, this application provides a data sending method, to improve flexibility of sending data by a system.

Figure 4:
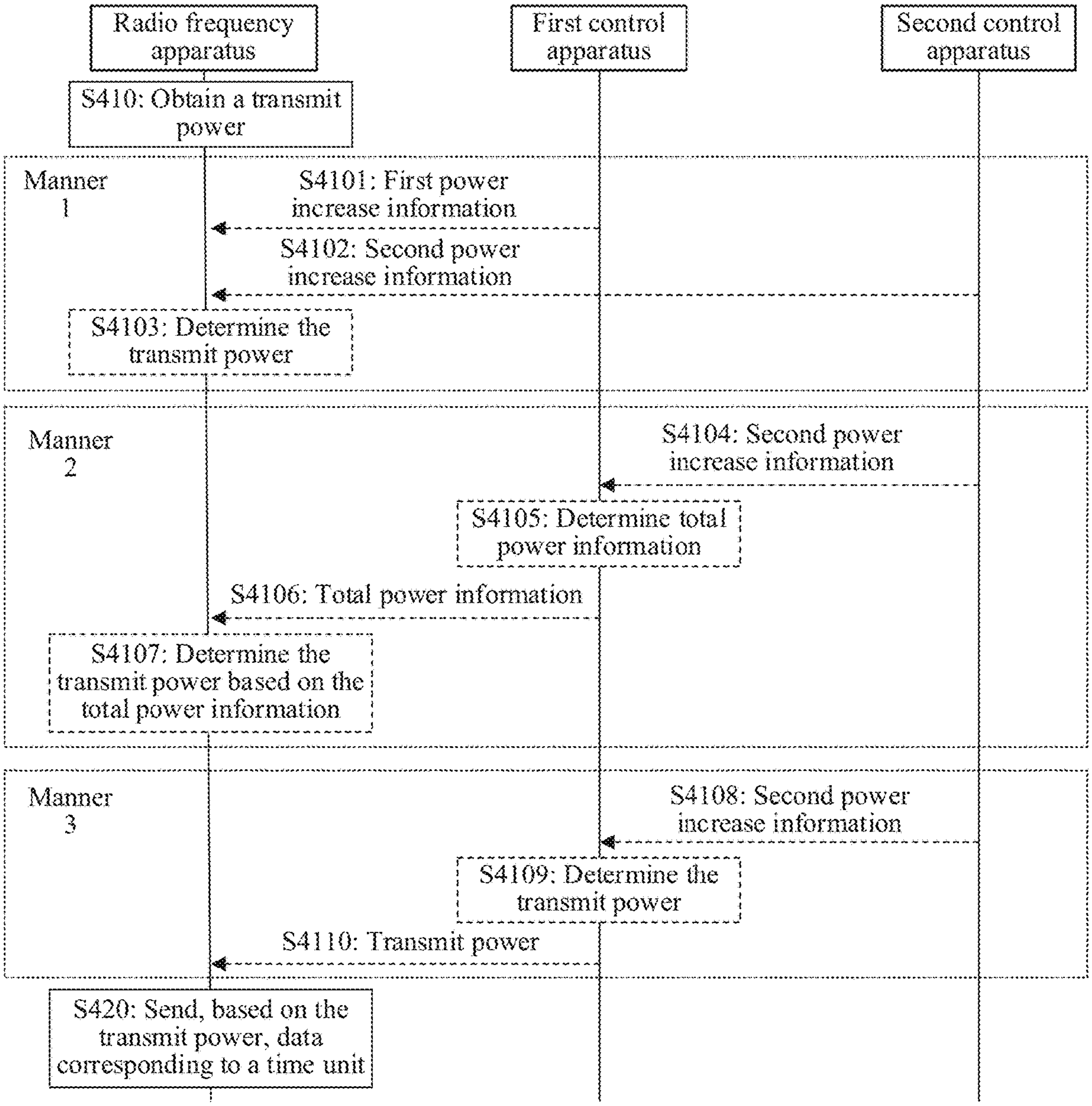
FIG. 4 is a schematic flowchart of a data sending method according to an embodiment of this application.

FIG. 4 is a schematic flowchart of a data sending method 400 according to an embodiment of this application.

S410: A radio frequency apparatus obtains a transmit power.

The transmit power is determined based on first power increase information and second power increase information. The first power increase information indicates a first power increase amplitude corresponding to a first standard in a time unit. The second power increase information indicates a second power increase amplitude corresponding to a second standard in the time unit.

The first standard and the second standard are two different baseband working standards. For example, the first standard is an NR standard, and the second standard is an LTE standard. Alternatively, the first standard is an LTE standard, and the second standard is an NR standard.

The transmit power is a transmit power that is shared by the first standard and the second standard. In other words, data sent by the radio frequency apparatus by using the transmit power includes data of the first standard and data of the second standard.

The radio frequency apparatus may obtain the transmit power in the following three manners, which are separately described below.

Manner 1

Step S410 includes steps S4101 to S4103.

S4101: A first control apparatus sends the first power increase information to the radio frequency apparatus. Correspondingly, the radio frequency apparatus receives the first power increase information from the first control apparatus.

The first power increase information indicates the first power increase amplitude corresponding to the first standard in the time unit.

Optionally, the time unit is a symbol.

The first power increase amplitude may indicate a multiple of power increase of a symbol. The multiple of power increase may be represented by using a decibel (where 1 dB=10 lg (A/B), and A/B represents the multiple). The first power increase information may include the symbol and the power increase decibel.

It should be noted that, the multiple of power increase of the symbol is a multiple by which a power of the symbol is increased compared with a configured power of the symbol.

Optionally, the first control apparatus sends a power configuration parameter of the first standard to the radio frequency apparatus. The power configuration parameter indicates a configured power of each of a plurality of symbols.

The configured power of the symbol may be represented by using a configured power spectrum configured by the first control apparatus for each symbol during power allocation. The configured power spectrum describes a correspondence between a frequency and a power. For example, the configured power spectrum may indicate a power for sending data on each subcarrier in one symbol. In this case, a configured power of the symbol is a total power of the configured power spectrum. For example, the configured power spectrum indicates that powers for sending data on a subcarrier #1, a subcarrier #2, and a subcarrier #3 in a symbol #1 are respectively 1 W, 1 W, and 2 W. In this case, the total power of the configured power spectrum is 4 W, and a configured power corresponding to the first standard in the symbol #1 is 4 W. In addition, if the first power increase amplitude indicates that the power corresponding to the first standard in the symbol #1 is increased by 3 dB (the multiple is approximately equal to 1), a power, obtained after the increase, corresponding to the first standard in the symbol #1 is 8 W. A power spectrum, obtained after the increase, corresponding to the first standard in the symbol #1 indicates that powers for sending data on the subcarrier #1, the subcarrier #2, and the subcarrier #3 are respectively 2 W, 2 W, and 4 W.

It should be understood that, when the first power increase amplitude indicates that the multiple of power increase of the symbol is o, it indicates that the power corresponding to the first standard in the symbol #1 is not increased, and data is sent still based on the configured power.

S4102: A second control apparatus sends the second power increase information to the radio frequency apparatus. Correspondingly, the radio frequency apparatus receives the second power increase information from the second control apparatus.

The second power increase information indicates the second power increase amplitude corresponding to the second standard in the time unit.

Descriptions of the second power increase information are similar to the descriptions of the first power increase information. For brevity, details are not described herein again.

S4103: The radio frequency apparatus determines the transmit power based on total power information. The total power information is determined based on the first power increase amplitude and the second power increase amplitude. The total power information is for determining a total power spectrum. The total power spectrum indicates a correspondence between a frequency and a power in the time unit.

The radio frequency apparatus may determine the total power information based on the first power increase amplitude and the second power increase amplitude. The total power information may have two forms. The first form is as follows: The total power information describes a power increase amplitude at each frequency in the time unit, so that the radio frequency apparatus can determine, based on a power configuration parameter of the time unit, a power, obtained after increase, at each frequency, to form the total power spectrum. The second form is as follows: The total power information directly describes a power, obtained after increase, at each frequency in the time unit, to form the total power spectrum.

For example, the radio frequency apparatus determines, based on the first increase information, a power increase amplitude corresponding to the first standard in the symbol #1, and determines, based on the second increase information, a power increase amplitude corresponding to the second standard in the symbol #1. Further, the radio frequency apparatus may determine, based on the power configuration parameter of the first standard and a power configuration parameter of the second standard, a power, obtained after increase, on each subcarrier in the symbol #1, to form the total power spectrum.

Figure 5:
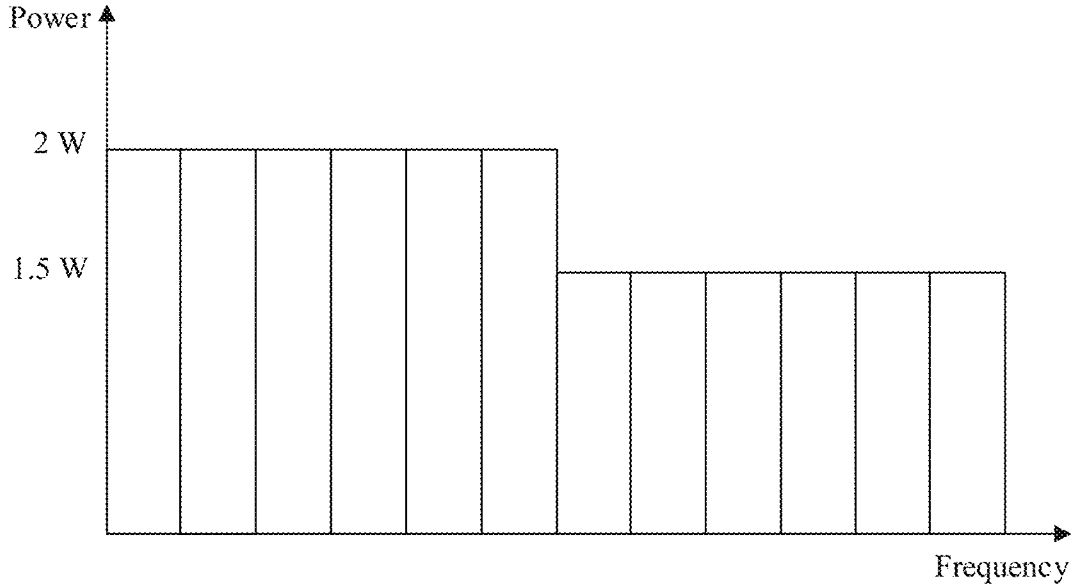
FIG. 5 is a schematic diagram of a total power spectrum according to an embodiment of this application.

By way of example but not limitation, the symbol #1 includes 12 subcarriers (e.g., a subcarrier #1 to a subcarrier #12). The subcarrier #1 to the subcarrier #6 are configured for data sending in the first standard. The subcarrier #7 to the subcarrier #12 are configured for data sending in the second standard. Configured powers on the subcarrier #1 to the subcarrier #12 are all 1 W. The first power increase information indicates that the power corresponding to the first standard in the symbol #1 is increased by one time. In this case, powers, increased by one time, on the subcarrier #1 to the subcarrier #6 are all 2 W. The second power increase information indicates that a power corresponding to the second standard in the symbol #1 is increased by 0.5 times. In this case, powers, increased by 0.5 times, on the subcarrier #7 to the subcarrier #12 are all 1.5 W. For ease of description, refer to FIG. 5. FIG. 5 shows a total power spectrum corresponding to the example. A horizontal coordinate represents a frequency. In this example, 12 subcarriers are used to represent frequencies, and a vertical coordinate represents a power of each subcarrier.

It should be understood that the foregoing is merely an example in which a frequency domain corresponding to the symbol #1 includes 12 subcarriers (e.g., one RB). In this embodiment of this application, the total power spectrum should include correspondences between powers and all frequency bands supported by the symbol #1. For example, when a frequency resource corresponding to one symbol is divided at a granularity of an RB, the power spectrum may describe a power corresponding to each RB in the symbol.

The radio frequency apparatus may determine, based on the total power spectrum and a data sending capability of the radio frequency apparatus, a transmit power for finally sending data.

Optionally, when a total power of the total power spectrum is greater than or equal to a first threshold, and a spectral density of the total power spectrum is greater than or equal to a second threshold, the radio frequency apparatus determines the transmit power by performing clipping processing on the total power spectrum.

In other words, when the total power spectrum indicates that a power obtained after increase exceeds a data sending capability range of the radio frequency apparatus, the radio frequency apparatus performs clipping processing on the total power spectrum, to enable a power sum of the two standards to fall within the data sending capability range of the radio frequency apparatus. When the total power spectrum meets two conditions, it may be considered that the power obtained after increase exceeds the data sending capability range of the radio frequency apparatus. The following describes the two conditions separately.

Condition 1: The total power of the total power spectrum is greater than or equal to the first threshold.

The total power is a sum of powers corresponding to all frequencies in the time unit. For example, in FIG. 5, the total power is an area of a total spectrum graph, and the subcarrier is used to represent the frequency. In this way, a total power, obtained after increase, on the 12 subcarriers is 21 W. A value of the first threshold is related to a transmit capability of sending data by the radio frequency apparatus. For example, the first threshold may be a rated transmit power for sending data by the radio frequency apparatus. If the total power is greater than the first threshold, it indicates that the rated transmit power of the radio frequency apparatus is fully used.

Condition 2: The spectral density of the total power spectrum is greater than or equal to the second threshold.

The spectral density is an average power of powers corresponding to all frequencies in the time unit. For example, in FIG. 5, the spectral density is an average power of the 12 subcarriers: 21/12=1.75 W. A value of the second threshold is also related to a transmit capability of sending data by the radio frequency apparatus. In a possible implementation, the value of the second threshold may be a value obtained by increasing a spectral density of the configured power spectrum corresponding to the configuration parameter by 1.8 dB. In this case, the condition 2 may be equivalently replaced with that a decibel by which the spectral density of the total power spectrum is increased compared with the spectral density of the configured power spectrum is greater than or equal to 1.8 dB. For example, in FIG. 5, configured powers on the 12 subcarriers that are not increased are 1 W, that is, the spectral density of the configured power spectrum is 1 W. A decibel by which the spectral density of the total power spectrum is increased compared with the spectral density of the configured power spectrum is 10 lg (e.g., 0.75), which is approximately equal to 1.2 dB and less than 1.8 dB.

If the total power spectrum meets the foregoing two conditions, the radio frequency apparatus needs to perform clipping processing on the total power spectrum.

The clipping processing may be overall reduction of a transmit power of the symbol or another power reduction manner that can enable at least one of the conditions to be not met.

It should be noted that, when the first power increase information indicates that an increase power corresponding to the first standard in the time unit is o, and the second power increase information indicates that an increase power corresponding to the second standard in the time unit is also o, the radio frequency apparatus may consider by default that a combined power of the two standards does not exceed the capability range in this case, and the radio frequency apparatus may not perform determining on the foregoing two conditions. Otherwise, the radio frequency apparatus needs to determine, based on the first increase information and the second increase information, whether the total power spectrum meets the foregoing two conditions.

Therefore, in the manner 1, the first control apparatus and the second control apparatus may separately send respective power increase information to the radio frequency apparatus. After receiving the two pieces of power increase information, the radio frequency apparatus combines the two pieces of power increase information, and further determines, based on the total power information obtained after combination in the two standards and the transmit capability of the radio frequency apparatus, the transmit power for finally sending data, so that a power can also be increased in a scenario in which two standards share a power, to improve flexibility of sending data by a system.

Manner 2

Step S410 includes step S4104 to step S4107.

S4104: A second control apparatus sends the second power increase information to a first control apparatus. Correspondingly, the first control apparatus receives the second power increase information from the second control apparatus.

For example, the first control apparatus and the second control apparatus may establish a communication link, and the second control apparatus sends the second increase information to the first control apparatus through the communication link.

S4105: The first control apparatus determines total power information.

The first control apparatus determines the total power information based on the first power increase information and the second power increase information received from the second control apparatus.

Descriptions of the first power increase information, the second power increase information, and the total power information are similar to the descriptions in the foregoing manner 1. For brevity, details are not described herein again.

It should be noted that, when the total power information directly describes a power, obtained after increase, at each frequency in the time unit, the second control apparatus may further send, to the first control apparatus, a power configuration parameter corresponding to the second standard.

S4106: The first control apparatus sends the total power information to the radio frequency apparatus. Correspondingly, the radio frequency apparatus receives the total power information from the first control apparatus.

S4107: The radio frequency apparatus determines the transmit power based on the total power information.

Descriptions in which the radio frequency apparatus determines the transmit power based on the total power information are similar to the descriptions in the foregoing manner 1. For brevity, details are not described herein again.

It should be understood that the foregoing is an example in which the first control apparatus determines the total power information. On the contrary, descriptions in which the first control apparatus sends the first power increase information to the second control apparatus, and the second control apparatus determines the total power information and sends the total power information to the radio frequency apparatus are similar. Details are not described again.

Therefore, in the manner 2, the first control apparatus or the second control apparatus may combine the first power increase information and the second power increase information to generate the total power information, and send the total power information to the radio frequency apparatus. Further, the radio frequency apparatus determines, based on the total power information obtained after combination in the two standards and a transmit capability of the radio frequency apparatus, a transmit power for finally sending data, so that a power can also be increased in a scenario in which two standards share a power, to improve flexibility of sending data by a system.

Manner 3

Step S410 includes step S4108 to step S4110.

S4108: A second control apparatus sends the second power increase information to a first control apparatus. Correspondingly, the first control apparatus receives the second power increase information from the second control apparatus.

For the step, similarly, refer to the foregoing step S4104. For brevity, details are not described herein again.

S4109: The first control apparatus determines the transmit power.

The first control apparatus may obtain capability information for sending data by the radio frequency apparatus. Further, the first control apparatus determines total power information based on the first power increase information and the second power increase information, and determines the transmit power based on the total power information. A manner in which the first control apparatus determines the transmit power based on the total power information is similar to a manner in which the radio frequency apparatus determines the transmit power based on the total power information. For brevity, details are not described herein again.

S4110: The first control apparatus sends the transmit power to the radio frequency apparatus. Correspondingly, the radio frequency apparatus receives the transmit power from the first control apparatus.

The first control apparatus may send the transmit power to the radio frequency apparatus by sending the total power information and a clipping policy, or the first control apparatus may directly send the transmit power to the radio frequency apparatus. This is not particularly limited in this application. The foregoing descriptions in which the first control apparatus determines the transmit power are similar to the descriptions in which the second control apparatus determines the transmit power. Details are not described again.

Therefore, in the manner 3, the first control apparatus or the second control apparatus may obtain the capability information for sending data by the radio frequency apparatus, generate the total power information based on the first power increase information and the second power increase information, and determine, based on the total power information, the transmit power for sending data by the radio frequency apparatus, so that a power can also be increased in a scenario in which two standards share a power, to improve flexibility of sending data by a system.

The foregoing describes the manners in which the radio frequency apparatus obtains the transmit power.

S420: The radio frequency apparatus sends, based on the transmit power, data corresponding to the time unit.

In other words, the radio frequency apparatus uses the transmit power to send the data corresponding to the time unit.

The data corresponding to the time unit may be a sum of data corresponding to the first standard in the time unit and data corresponding to the second standard in the time unit.

For example, the radio frequency apparatus sends, based on the transmit power, data corresponding to the first standard in the symbol #1 and data corresponding to the second standard in the symbol #1, that is, the first standard and the second standard share the transmit power in the symbol #1.

Therefore, in this embodiment of this application, the radio frequency apparatus obtains the transmit power determined based on both the first power increase information and the second power increase information, and may also increase a power in a scenario in which two standards share a power, to improve flexibility of sending data by a system.

Figure 6:
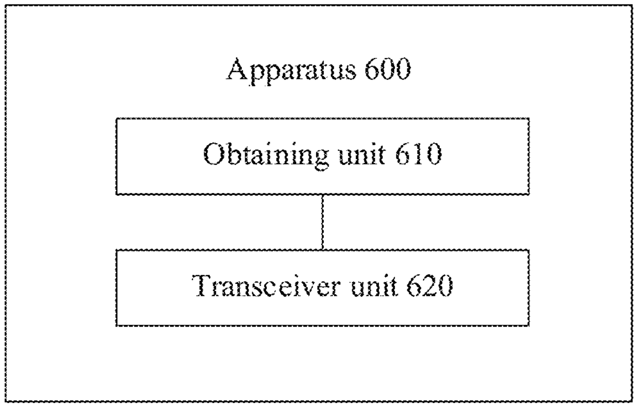
FIG. 6 to FIG. 8 are schematic diagrams of possible structures of apparatuses according to embodiments of this application.
Figure 7:
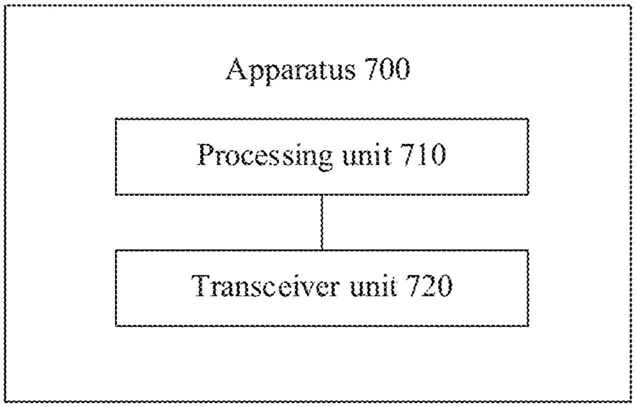
Figure 8:
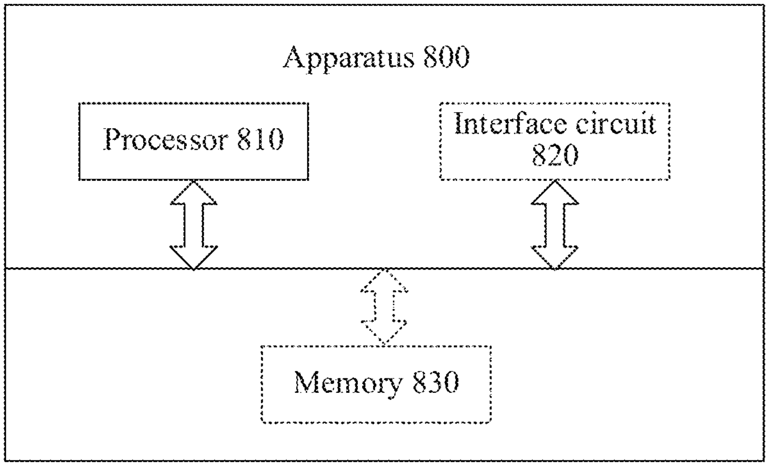

FIG. 6 to FIG. 8 are schematic diagrams of possible structures of apparatuses according to embodiments of this application. The communication apparatuses may be configured to implement functions of the radio frequency apparatus, the first control apparatus, or the second control apparatus in the foregoing method embodiments, and therefore can also achieve beneficial effects of the foregoing method embodiments. In embodiments of this application, the apparatus may be the radio frequency apparatus, the first control apparatus, or the second control apparatus, or may be a module (for example, a chip) used in the radio frequency apparatus, the first control apparatus, or the second control apparatus.

As shown in FIG. 6, the apparatus 600 includes an obtaining unit 610 and a transceiver unit 620. The apparatus 600 is configured to implement the functions of the radio frequency apparatus in the method embodiment shown in FIG. 4. Alternatively, the apparatus 600 may include a module configured to implement any function or operation of the radio frequency apparatus in the method embodiment shown in FIG. 4. The module may be completely or partially implemented by using software, hardware, firmware, or any combination thereof.

When the apparatus 600 is configured to implement the functions of the signal processing apparatus in the method embodiment shown in FIG. 4, the obtaining unit 610 is configured to obtain a transmit power. The transmit power is determined based on first power increase information and second power increase information. The first power increase information indicates a first power increase amplitude corresponding to a first standard in a time unit. The second power increase information indicates a second power increase amplitude corresponding to a second standard in the time unit. The transceiver unit 620 is configured to send, based on the transmit power, data corresponding to the time unit. The first standard and the second standard are different baseband working standards.

Therefore, in this embodiment of this application, the radio frequency apparatus obtains the transmit power determined based on both the first power increase information and the second power increase information, and may also increase a power in a scenario in which two standards share a power, to improve flexibility of sending data by a system.

For more detailed descriptions of the obtaining unit 610 and the transceiver unit 620, directly refer to related descriptions in the method embodiment shown in FIG. 4. Details are not described herein again.

As shown in FIG. 7, the apparatus 700 includes a processing unit 710 and a transceiver unit 720. The apparatus 700 is configured to implement the functions of the first control apparatus or the second control apparatus in the method embodiment shown in FIG. 4. Alternatively, the apparatus 700 may include a module configured to implement any function or operation of the first control apparatus or the second control apparatus in the method embodiment shown in FIG. 4. The module may be completely or partially implemented by using software, hardware, firmware, or any combination thereof.

When the apparatus 700 is configured to implement the functions of the first control apparatus in the method embodiment shown in FIG. 4, the transceiver unit 720 is configured to send first power increase information. The first power increase information indicates a first power increase amplitude corresponding to a first standard in a time unit. The first power increase amplitude and a second power increase amplitude corresponding to a second standard in the time unit are for determining total power information. The total power information is for determining a transmit power. The transmit power is for sending data corresponding to the time unit. The first standard and the second standard are different baseband working standards. Alternatively, the transceiver unit 720 is configured to receive second power increase information from a second control apparatus. The second power increase information indicates the second power increase amplitude corresponding to the second standard in the time unit. The processing unit 710 is configured to determine the total power information based on the first power increase information and the second power increase information. The first power increase information indicates the first power increase amplitude corresponding to the first standard in the time unit. The total power information is determined based on the first power increase amplitude and the second power increase amplitude. The total power information is for determining the transmit power. The transmit power is for sending the data corresponding to the time unit. The transceiver unit 720 is further configured to send the total power information to a radio frequency apparatus. The first standard and the second standard are different baseband working standards.

Therefore, in this embodiment of this application, the radio frequency apparatus obtains the transmit power determined based on both the first power increase information and the second power increase information, and may also increase a power in a scenario in which two standards share a power, to improve flexibility of sending data by a system.

For more detailed descriptions of the processing unit 710 and the transceiver unit 720, directly refer to related descriptions in the method embodiment shown in FIG. 4. Details are not described herein again.

When the apparatus 700 is configured to implement the functions of the second control apparatus in the method embodiment shown in FIG. 4, the transceiver unit 720 is configured to send second power increase information. The second power increase information indicates a second power increase amplitude corresponding to a second standard in a time unit. The second power increase amplitude and a first power increase amplitude corresponding to a first standard in the time unit are for determining total power information. The total power information is for determining a transmit power. The transmit power is for sending data corresponding to the time unit. The first standard and the second standard are different baseband working standards.

Therefore, in this embodiment of this application, the radio frequency apparatus obtains the transmit power determined based on both first power increase information and the second power increase information, and may also increase a power in a scenario in which two standards share a power, to improve flexibility of sending data by a system.

For more detailed descriptions of the processing unit 710 and the transceiver unit 720, directly refer to related descriptions in the method embodiment shown in FIG. 4. Details are not described herein again.

As shown in FIG. 8, the apparatus 800 includes a processor 810, and optionally further includes an interface circuit 820. The processor 810 and the interface circuit 820 are coupled to each other. It may be understood that the interface circuit 820 may be a transceiver or an input/output interface. Optionally, the apparatus 800 may further include a memory 830, configured to store instructions executed by the processor 810, store input data required for running the instructions by the processor 810, or store data generated after the processor 810 runs the instructions.

When the apparatus 800 is configured to implement the functions of the radio frequency apparatus in the method embodiment in FIG. 4, the processor 810 is configured to implement all or some functions of the obtaining unit 610, and the interface circuit 820 is configured to implement functions of the transceiver unit 620. Alternatively, the interface circuit 820 is configured to implement all or some functions of the obtaining unit 620 and functions of the transceiver unit 620.

When the apparatus 800 is configured to implement the functions of the first control apparatus in the method embodiment in FIG. 4, the processor 810 is configured to implement functions of the processing unit 710, and the interface circuit 820 is configured to implement functions of the transceiver unit 720.

When the apparatus 800 is configured to implement the functions of the second control apparatus in the method embodiment in FIG. 4, the processor 810 is configured to implement functions of the processing unit 710, and the interface circuit 820 is configured to implement functions of the transceiver unit 720.

It may be understood that, in embodiments of this application, the processor may be a central processing unit (CPU), or may be another general-purpose processor, a digital signal processor (DSP), an application-specific integrated circuit (ASIC), a field programmable gate array (FFPGA) or another programmable logic device, a transistor logic device, a hardware component, or any combination thereof. The general-purpose processor may be a microprocessor, or may be any conventional processor.

In embodiments of this application, the memory may be a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well known in the art. For example, the storage medium is coupled to the processor, so that the processor can read information from the storage medium and write information into the storage medium. Certainly, the storage medium may alternatively be a component of the processor. The processor and the storage medium may be located in the ASIC. In addition, the ASIC may be located in a network device or a terminal device. Certainly, the processor and the storage medium may alternatively exist in the network device or the terminal device as discrete devices.

All or some of the foregoing embodiments may be implemented by software, hardware, firmware, or any combination thereof. When software is used to implement embodiments, all or some of embodiments may be implemented in a form of a computer program product. The computer program product includes one or more computer programs and instructions. When the computer programs or the instructions are loaded and executed on a computer, all or some of the procedures or functions in embodiments of this application are executed. The computer may be a general-purpose computer, a dedicated computer, a computer network, a network device, a terminal device, or another programmable apparatus. The computer programs or the instructions may be stored in a computer-readable storage medium, or may be transmitted through the computer-readable storage medium. The computer-readable storage medium may be any usable medium accessible by the computer, or a data storage device, like a server, integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD).

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It should be understood that, in embodiments of this application, numbers such as "first" and "second" are merely used to distinguish between different objects, for example, to distinguish between different network devices, and constitute no limitation on the scope of embodiments of this application. Embodiments of this application are not limited thereto.

It should be further understood that in this application, "when", "if", and "if" all refer to that the network element performs corresponding processing in an objective case, and are not intended to limit time, and are not required to perform a determining action during implementation by the network element, nor does it imply that there is any other limitation.

It should be further understood that, in embodiments of this application, "B corresponding to A" indicates that B is associated with A, and B may be determined based on A. However, it should further be understood that determining B based on A does not mean that B is determined only based on A, and B may also be determined based on A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, meanings of "an item includes one or more of the following: A, B, and C" in this application usually mean that the item may be any of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C and C; and another combination of A, B and C. The foregoing uses three elements A, B, and C as an example to describe the optional entries of the item. When expressed as "the item includes at least one of A, B, . . . , and X", that is, when there are more elements in the expression, entries to which the item can be applied can also be obtained according to the foregoing rules.

It may be understood that various numbers in embodiments of this application are merely used for differentiation for ease of description, and are not used to limit the scope of embodiments of this application. The sequence numbers of the foregoing processes do not mean execution sequence. The execution sequence of the processes should be determined based on functions and internal logic of the processes.

What is claimed is:

1. A method, comprising:

obtaining, by a radio frequency apparatus, a transmit power, wherein the transmit power is determined based on first power increase information and second power increase information, the first power increase information indicates a first power increase amplitude corresponding to a first standard in a time unit, and the second power increase information indicates a second power increase amplitude corresponding to a second standard in the time unit; and sending, by the radio frequency apparatus based on the transmit power, data corresponding to the time unit, wherein the first standard and the second standard are different baseband working standards.

2. The method according to claim 1, wherein obtaining, by the radio frequency apparatus, the transmit power comprises:

receiving, by the radio frequency apparatus, the first power increase information from a first control apparatus;

receiving, by the radio frequency apparatus, the second power increase information from a second control apparatus; and determining, by the radio frequency apparatus, the transmit power based on total power information, wherein the total power information is determined based on the first power increase amplitude and the second power increase amplitude.

3. The method according to claim 2, wherein determining, by the radio frequency apparatus, the transmit power based on the total power information comprises:

when a total power of a total power spectrum is greater than or equal to a first threshold, and a spectral density of the total power spectrum is greater than or equal to a second threshold, determining, by the radio frequency apparatus, the transmit power by performing clipping processing on the total power spectrum, wherein the total power spectrum is determined based on the total power information, and the total power spectrum indicates a correspondence between a frequency and a power in the time unit.

4. The method according to claim 1, wherein obtaining, by the radio frequency apparatus, the transmit power comprises:

receiving, by the radio frequency apparatus, total power information from a first control apparatus.

5. The method according to claim 1, wherein obtaining, by the radio frequency apparatus, the transmit power comprises:

receiving, by the radio frequency apparatus, total power information from a second control apparatus; and determining, by the radio frequency apparatus, the transmit power based on the total power information, wherein the total power information is determined based on the first power increase amplitude and the second power increase amplitude.

6. The method according to claim 1, wherein obtaining, by the radio frequency apparatus, the transmit power comprises:

receiving, by the radio frequency apparatus, the transmit power from a first control apparatus.

7. The method according to claim 1, wherein obtaining, by the radio frequency apparatus, the transmit power comprises:

receiving, by the radio frequency apparatus, the transmit power from a second control apparatus.

8. The method according to claim 1, wherein the time unit comprises a symbol.

9. An apparatus, comprising:

at least one processor; and at least one memory storing instructions that, upon execution by the at least one processor, causes the apparatus to:

obtain a transmit power, wherein the transmit power is determined based on first power increase information and second power increase information, the first power increase information indicates a first power increase amplitude corresponding to a first standard in a time unit, and the second power increase information indicates a second power increase amplitude corresponding to a second standard in the time unit; and send, based on the transmit power, data corresponding to the time unit, wherein the first standard and the second standard are different baseband working standards.

10. The apparatus according to claim 9, wherein to obtain the transmit power, the instructions upon execution by the at least one processor cause the apparatus to:

receive the first power increase information from a first control apparatus;

receive the second power increase information from a second control apparatus; and determine the transmit power based on total power information, wherein the total power information is determined based on the first power increase amplitude and the second power increase amplitude.

11. The apparatus according to claim 10, wherein to determine the transmit power based on the total power information, the instructions upon execution by the at least one processor cause the apparatus to:

when a total power of a total power spectrum is greater than or equal to a first threshold, and a spectral density of the total power spectrum is greater than or equal to a second threshold, determine the transmit power by performing clipping processing on the total power spectrum, wherein the total power spectrum is determined based on the total power information, and the total power spectrum indicates a correspondence between a frequency and a power in the time unit.

12. The apparatus according to claim 9, wherein to obtain the transmit power, the instructions upon execution by the at least one processor cause the apparatus to:

receive total power information from a first control apparatus; or receive the total power information from a second control apparatus; and determine the transmit power based on the total power information, wherein the total power information is determined based on the first power increase amplitude and the second power increase amplitude.

13. The apparatus according to claim 9, wherein to obtain the transmit power, the instructions upon execution by the at least one processor cause the apparatus to:

receive the transmit power from a first control apparatus; or receive the transmit power from a second control apparatus.

14. The apparatus according to claim 9, wherein the time unit comprises a symbol.

15. A non-transitory computer-readable storage medium, wherein the non-transitory computer-readable storage medium stores at least one computer program comprising instructions that, when executed by at least one processor, enables the at least one processor to:

obtain a transmit power, wherein the transmit power is determined based on first power increase information and second power increase information, the first power increase information indicates a first power increase amplitude corresponding to a first standard in a time unit, and the second power increase information indicates a second power increase amplitude corresponding to a second standard in the time unit; and send, based on the transmit power, data corresponding to the time unit, wherein the first standard and the second standard are different baseband working standards.

16. The non-transitory computer-readable storage medium according to claim 15, wherein to obtain the transmit power, the instructions when executed enable the at least one processor to:

receive the first power increase information from a first control apparatus;

receive the second power increase information from a second control apparatus; and determine the transmit power based on total power information, wherein the total power information is determined based on the first power increase amplitude and the second power increase amplitude.

17. The non-transitory computer-readable storage medium according to claim 16, wherein to determine the transmit power based on the total power information, the instructions when executed enable the at least one processor to:

when a total power of a total power spectrum is greater than or equal to a first threshold, and a spectral density of the total power spectrum is greater than or equal to a second threshold, determine the transmit power by performing clipping processing on the total power spectrum, wherein the total power spectrum is determined based on the total power information, and the total power spectrum indicates a correspondence between a frequency and a power in the time unit.

18. The non-transitory computer-readable storage medium according to claim 15, wherein to obtain the transmit power, the instructions when executed enable the at least one processor to:

receive total power information from a first control apparatus; or receive the total power information from a second control apparatus; and determine the transmit power based on the total power information, wherein the total power information is determined based on the first power increase amplitude and the second power increase amplitude.

19. The non-transitory computer-readable storage medium according to claim 15, wherein to obtain the transmit power, the instructions when executed enable the at least one processor to:

receive the transmit power from a first control apparatus; or receive the transmit power from a second control apparatus.

20. The non-transitory computer-readable storage medium according to claim 15, wherein the time unit comprises a symbol.

* * * * *